(No Model.)
J. H. STEEN.
SURFACE CUTTING TOOL.
No. 492,310.   Patented Feb. 21, 1893.
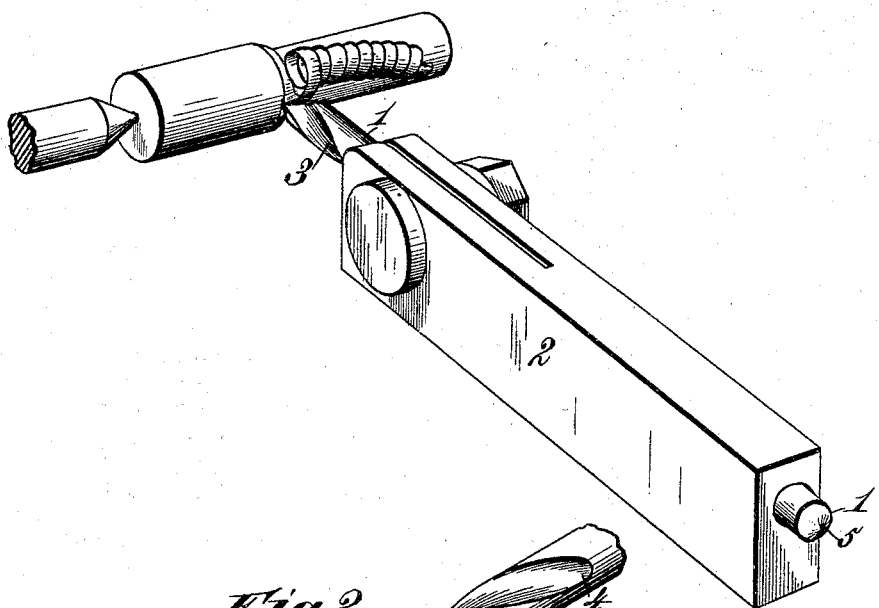
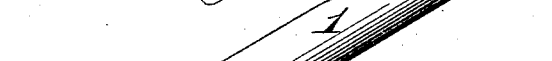
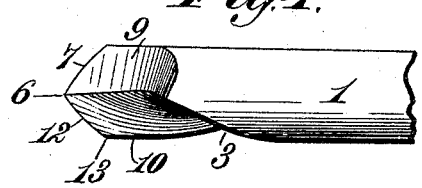
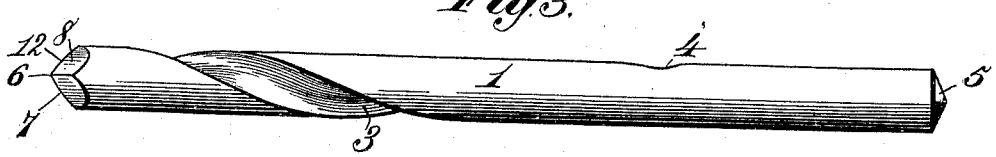
Witnesses:
Robert Everett
Dennis Sumby
Inventor:
James H. Steen
By James L. Norris
Atty.

UNITED STATES PATENT OFFICE.

JAMES H. STEEN, OF CANTON, ASSIGNOR OF ONE-HALF TO JAMES W. COLE, OF COLUMBUS, OHIO.

SURFACE-CUTTING TOOL.

SPECIFICATION forming part of Letters Patent No. 492,310, dated February 21, 1893.

Application filed April 21, 1892. Serial No. 430,043. (No model.)

*To all whom it may concern:*

Be it known that I, JAMES H. STEEN, a citizen of the United States, residing at Canton, in the county of Stark and State of Ohio, have invented new and useful Improvements in Surface-Cutting Tools, of which the following is a specification.

This invention has for its object to provide a new and improved cutting tool particularly designed for employment in lathes to turn metallic objects, but useful in other machines or wherever metal surfaced cutting is required.

The invention also has for its object to provide a novel spirally grooved turning tool of uniform diameter which can be readily and economically sharpened by grinding only, without the necessity of re-dressing, and whereby the spiral groove preserves an inclined plane back of the cutting edge for the purpose of enabling the latter to properly bite or cut into the surface of the metal at the best angle for removing the surface of the latter.

To accomplish these objects my invention consists in a lathe turning tool having a single spiral groove and provided at one extremity with oppositely beveled portions, a spiral cutting edge, and a longitudinally beveled upper clearance surface for permitting lateral movement of the turnings.

The invention is illustrated by the accompanying drawings, in which—

Figure 1, is a perspective view of my improved cutting tool arranged in a suitable tool holder and in the act of turning the shaft. Fig. 2, is a broken perspective view of the cutting tool. Fig. 3, is a plan view of the tool looking at the under side thereof, and Fig. 4, is a detail view on an enlarged scale of the cutting end portion of the tool.

In order to enable those skilled in the art to make and use my invention I will now describe the same in detail, referring to the drawings wherein The numeral 1 indicates the tool which is of uniform diameter from end to end so that it can be fitted into and be properly clamped by a tool holder 2 of any suitable construction. The tool is constructed with a single spiral groove 3, which as here shown, commences at the point 4 remote from the end 5 to leave this end portion of the tool in the form of a solid cylinder; but this is not indispensable. The spiral groove extends from the point 4 to the outer extremity of the tool and terminates in a point 6. The upper extremity is ground or dressed off to form two oppositely beveled portions or surfaces 7 and 8, and the outer end portion of the tool is also constructed with a beveled upper side 9, which extends longitudinally or in the direction of the length of the tool to permit lateral passage or movement of the turnings. The outer end of the spiral groove serves to provide an inclined plane, or a curved incline 10, back from the cutting edge 12, so that the tool is rendered susceptible of properly biting or cutting into the surface of the metal at the very best possible angle for removing the surface thereof. The cutting edge 12 extends in a spiral or curved line from the point 6 to the outer end portion 13 of the cutting edge, as will be best understood by reference to the enlarged detail view Fig. 4. This spiral form of the cutting edge 12 renders it possible to provide a very sharp edge while there is sufficient metal immediately back of such edge to secure the requisite strength and radiation of heat, so that the tool can be employed at a maximum speed in a lathe or planer without injury resulting from undue heating.

The cutting tool is cylindrical and of uniform diameter from end to end and consequently when the cutting edge becomes worn away, the tool can be slightly rotated axially in its holder, before using, to bring the cutting edge to its original position and thus present such cutting edge at the same angles to the surfaces of the metal which is to be removed.

The cutting tool should be rigidly held in a solid manner to prevent it from revolving or turning when operating to remove the surfaces of metal objects.

The holder is preferably constructed as described and claimed in the Letters Patent No. 463,394 issued to me November 17, 1891.

By my invention the spirally grooved and beveled construction produces a tool which is substantially different from an ordinary twist drill, in that I am enabled to practically use the device for turning cylindrical metal objects or removing the surface from objects of other form.

A substantial difference between my improved cutting tool and an ordinary drill resides in the fact that a drill requires to be ground with a clearance back from the edge of the spiral the entire length of the groove, for otherwise the drill would heat, expand and choke or break in the hole being bored.

My improved tool is of uniform diameter so that it can be gripped solidly, and the cutting edge operates to cleave or remove the surface from a metal object revolving in a lathe.

Although, I have particularly mentioned the cutting tool as employed in a lathe, it will be obvious that it can be employed in a planing or shaping machine or wherever the surface of a metallic object is to be removed.

In the use of a cutting tool in a lathe, the longitudinally beveled upper side 9 serves to direct the spiral cuttings in a lateral direction.

Having thus described my invention, what I claim is—

1. A metal cutting tool provided with a single spiral groove terminating at one end in a cutting edge, said tool having a beveled clearance surface 9 for permitting lateral passage or movement of the cuttings, substantially as described.

2. A lathe turning or metal cutting tool having a single spiral groove 3 and provided at one extremity with oppositely beveled portions 7 and 8, a spiral cutting edge 12, and a longitudinally beveled upper clearance surface 9 for permitting lateral passage or movement of the turnings, substantially as described.

In testimony whereof I have hereunto set my hand and affixed my seal in presence of two subscribing witnesses.

JAMES H. STEEN. [L. S.]

Witnesses:
A. J. TSCHANTZ,
F. W. BOND.